United States Patent
Karthikeyan et al.

(10) Patent No.: US 11,588,721 B2
(45) Date of Patent: Feb. 21, 2023

(54) MEASURING PERFORMANCE OF VIRTUAL DESKTOP EVENT REDIRECTION

(71) Applicant: VMWARE, INC., Palo Alto, CA (US)

(72) Inventors: Janani Karthikeyan, Tiruppur (IN); Lakshmi Gayatri Kundem, Bangalore (IN); Duraipandian Kuppuraman, Bangalore (IN); Srinivas Shyam Pinjala, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 22 days.

(21) Appl. No.: 17/411,080

(22) Filed: Aug. 25, 2021

(65) Prior Publication Data
US 2023/0007839 A1    Jan. 12, 2023

(30) Foreign Application Priority Data

Jul. 12, 2021  (IN) .............................. 202141031199

(51) Int. Cl.
| | |
|---|---|
| G06F 15/173 | (2006.01) |
| H04L 43/50 | (2022.01) |
| G06F 9/455 | (2018.01) |
| G06K 19/06 | (2006.01) |
| H04L 43/045 | (2022.01) |

(52) U.S. Cl.
CPC .......... H04L 43/50 (2013.01); G06F 9/45558 (2013.01); G06K 19/06037 (2013.01); H04L 43/045 (2013.01)

(58) Field of Classification Search
None
See application file for complete search history.

(56) References Cited

U.S. PATENT DOCUMENTS 10,917,471 B1 * 2/2021 Karumbunathan ......................... H04L 67/1097

* cited by examiner

*Primary Examiner* — Wing F Chan
*Assistant Examiner* — Andrew Woo
(74) *Attorney, Agent, or Firm* — Patterson + Sheridan, LLP (57) ABSTRACT

The disclosure provides an approach for measuring performance between a virtualized desktop infrastructure (VDI) client running on a client device and a remote computing device. Embodiments include generating, by a performance client on the client device, an event and storing a time associated with generating the event. Embodiments include transmitting, by the VDI client to the remote computing device, a message based on the OS event. Embodiments include determining, by a performance agent on the remote computing device, a time associated with receiving the message at the remote computing device and causing an indication of the time to be displayed in a virtual desktop screen. Embodiments include extracting, by the performance client, from the virtual desktop screen, the time, and determining a performance metric based on the extracted time and the time associated with receiving the message at the remote computing device.

14 Claims, 4 Drawing Sheets

MEASURING PERFORMANCE OF VIRTUAL DESKTOP EVENT REDIRECTION

RELATED APPLICATION

Benefit is claimed under 35 U.S.C. 119(a)-(d) to Foreign Application Serial No. 202141031199 filed in India entitled "MEASURING PERFORMANCE OF VIRTUAL DESKTOP EVENT REDIRECTION", on Jul. 12, 2021, by VMware, Inc., which is herein incorporated in its entirety by reference for all purposes.

BACKGROUND

In a virtual desktop infrastructure (VDI) environment, a local client device can access a remote virtual or physical desktop or remote application that is running on a remote device and displayed at the local client device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse) associated with the client device, and operating system (OS) events generated based on the user's inputs are redirected from the client device to the remote device on which the virtual desktop is located.

Event redirection from a client device to a virtual desktop involves transmission over a network on an ongoing basis as the user interacts with the virtual desktop. As such, any network connection issues (e.g., if the network connection is throttled or otherwise operates at a reduced speed) may result in delayed event redirection and, consequently, lag between user inputs and corresponding responses within the virtual desktop. Such lag may significantly reduce the ability of a virtual desktop to function as intended.

Measuring performance between a client device and a virtual desktop is useful for determining whether any connection issues exist and, if so, taking actions to optimize the performance of the virtual desktop in view of the network connection issues. However, while there are existing techniques for determining certain network performance metrics in general, these techniques are not specifically tailored to detecting performance issues related to event redirection in the context of virtual desktops.

Accordingly, there is a need in the art for improved performance measurement techniques for virtual desktops.

SUMMARY

A method of measuring performance between a virtualized desktop infrastructure (VDI) client running on a client device and a remote computing device, wherein the remote computing device is connected to the VDI client through a network. The method includes generating, by a performance client on the client device, an operating system (OS) event. The method further includes storing, by the performance client, a time associated with generating the OS event on the client device. The method further includes transmitting, by the VDI client to the remote computing device, a message based on the OS event. The method further includes determining, by a performance agent on the remote computing device, a time associated with receiving the message at the remote computing device. The method further includes causing, by the performance agent, an indication of the time associated with receiving the message at the remote computing device to be displayed in a virtual desktop screen. The method further includes extracting, by the performance client, from the virtual desktop screen, the time associated with receiving the message at the remote computing device. The method further includes determining, by the performance client, a performance metric based on the time associated with generating the OS event on the client device and the time associated with receiving the message at the remote computing device.

Further embodiments include a non-transitory computer-readable storage medium storing instructions that, when executed by a computer system, cause the computer system to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for measuring performance between a virtual desktop client and a remote device. In certain embodiments, event redirection is used to redirect user input from a client device to a virtual desktop residing on a remote device, such as via communication between a virtual desktop infrastructure (VDI) client on the client device and a VDI agent on the remote device. Event redirection, such as operating system (OS) event redirection, in a VDI environment is described in more detail in U.S. patent application Ser. No. 16/444,840, the contents of which are incorporated by reference herein in their entirety.

In order to measure performance between the VDI client and the remote device on which the virtual desktop resides, embodiments described herein involve the use of a performance client on the client device and a performance agent on the remote device. In an example, the performance client generates events on the client device, such as mouse and keyboard events, which are captured by the VDI client and redirected to the VDI agent on the remote device. The performance client stores the times at which it generates the events.

On the remote device side, the performance agent determines receipt times indicating the times at which the events were received by the VDI agent. The performance agent then causes an indication of each of the receipt times to be displayed within a screen of the virtual desktop, such as in a canvas that runs in the virtual desktop and is associated with the performance agent. The indications of the receipt times may be in the form of digital codes, such as quick response (QR) codes.

On the client device side, the performance client is able to extract the receipt times from the virtual desktop screen, which is continuously transmitted to the client device. For example, the performance client may capture the digital codes displayed in the canvas within the virtual desktop screen and determine the receipt times from the digital codes. The performance client then compares the receipt time for each event with the stored time at which the performance client generated the event in order to determine a performance metric associated with the event. For example, a difference between the receipt time for an event and the time at which the event was generated may be used to determine a latency between the VDI client and the remote device.

Additional performance metrics may also be determined using techniques described herein. For example, in addition to determining the difference between the time at which an event was generated on the client device and the time at which the event was received on the remote device, the performance client may also determine a full round trip time (e.g., client device to remote device, and back to client device) by determining a difference between the time the event was generated on the client device and the time at which the indications of receipt times are displayed in the virtual desktop screen, as seen from the client device. Alternatively, rather than or in addition to displaying indications of receipt times, the performance agent may cause indications of display times to be displayed in the virtual desktop screen (e.g., when an event is received, performance agent may cause a digital code of the current time to be displayed rather than or in addition to the receipt time of the event). In some embodiments, performance client may further determine a performance metric between the remote device and the client device by determining a difference between the time at which the performance agent performs operations to cause an indication to be displayed in the virtual desktop screen (or the receipt time of the event) and the time at which the indication is visible in the virtual desktop screen from the client device.

Notably, techniques described herein provide mechanisms by which performance between a VDI client and a remote device can be determined without requiring the separate transmission of receipt times from the remote device to the client device. By utilizing the virtual desktop screen, which is already being transmitted from the remote device to the client device, to transfer the receipt times of the events generated by the performance client back to the performance client, techniques described herein allow for efficient performance measurement that does not unduly increase network traffic.

Measuring performance between a VDI client and a remote device allows for various optimizations to be implemented as appropriate, such as when latency rises above a threshold. For example, in order to reduce latency, a frame rate associated with the virtual desktop may be reduced. In another example, events occurring at the client device may be batched for redirection to the remote device, such as by transmitting a plurality of events in a single message at regular intervals or when a certain number of events have occurred. In yet another example, certain intermediary events between a first event and a second event may be dropped and not redirected to the remote device. For example, if a series of mouse move events beginning at point A and ending at point Z occur, the intermediary events representing movements from points B-Y may be dropped, with the VDI client transmitting only a single mouse move event from point A to Z.

These optimizations are included as examples, and other optimizations are possible based on measured performance. Techniques described herein allow for such optimizations to be dynamically implemented in a targeted manner when needed based on measured performance and, for example, to be discontinued when no longer needed (e.g., when latency falls below a threshold).

Figure 1:
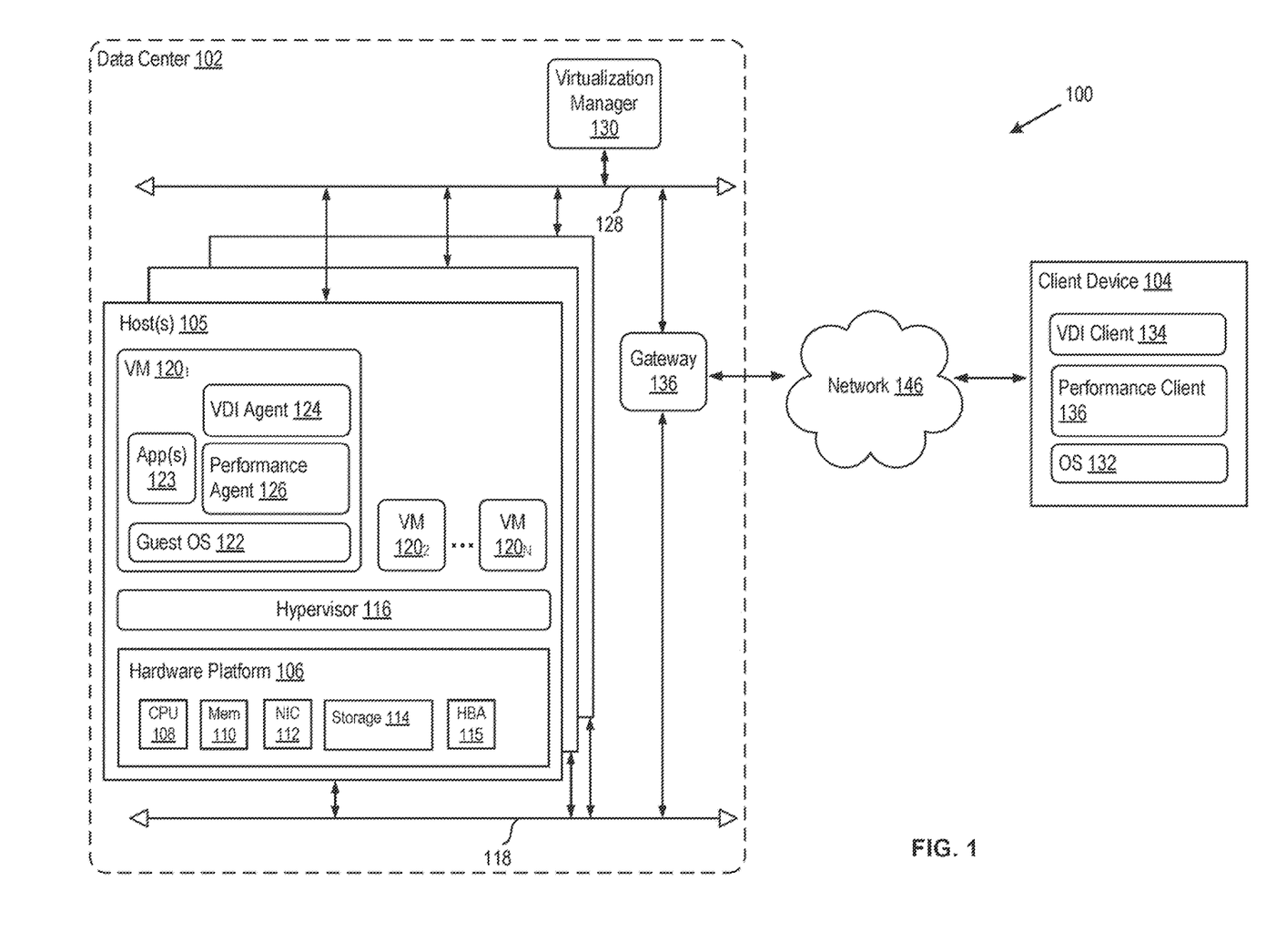
FIG. 1 depicts a block diagram of a virtualized desktop infrastructure system in which one or more embodiments of the present invention may be implemented.

FIG. 1 depicts a block diagram of a virtualized desktop infrastructure (VDI) system 100 in which one or more embodiments of the present invention may be implemented. VDI system 100 comprises at least one client device 104 and a data center 102, connected by a network 146. Network 146 may be, for example, a direct link, a local area network (LAN), a wide area network (WAN) such as the Internet, another type of network, or a combination of these.

Client device 104 is a physical device, such as a general purpose desktop computer or mobile computer. A mobile computer may be, for example, a laptop, a mobile phone, or a tablet computer. Client device 104 includes VDI client 134, OS 132, and performance client 136. In certain embodiments, VDI client 134 and performance client 136 run on top of OS 132. OS 132 may be a standard, commodity operating system.

VDI client 134 is a user-side interface of a virtualized desktop running on one of virtual machines (VMs) 120. As used herein, a "virtualized desktop" or "remote desktop" is a desktop running on one of VMs 120 that is displayed remotely on client device 104, as though the remote desktop were running on client device 104. By opening VDI client 134, a user of client device 104 accesses, through network 146, a remote desktop running in remote data center 102, from any location, using client device 104. Frames of the remote desktop running on VM 120 are transmitted to VDI client 134 at a certain frame rate using a desktop delivery protocol such as VMware® Blast™, or Microsoft® Remote Desktop Protocol (RDP)™ In some embodiments, the frame rate at which frames of the remote desktop are transmitted to VDI client 134 is determined based on one or more performance metrics determined by performance client 136 using techniques described herein. For example, the frame rate may be reduced if latency rises above a threshold and/or the frame rate may be increased if latency falls below a threshold. Latency is included as an example of a performance metric, and other performance metrics may also be determined and used to perform optimizations.

After transmission, the frames are displayed on client device 104 for interaction by the user. Client device 104 sends user inputs to VM 120 for processing on VM 120 of data center 102, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others.

As the user interacts with the virtual desktop, such as using a mouse and keyboard, the user input events are redirected by VDI client 134 to VDI agent 124. Certain aspects of event redirection may be optimized based on one or more performance metrics determined by performance client 136 using techniques described herein. For example, events may be batched for redirection and/or certain intermediary events between a first event and a second event may be dropped if latency rises above a threshold, and such optimizations may be discontinued if latency falls below a threshold.

Performance client 136 generally performs operations related to measuring performance between VDI client 134 and one or more of hosts 105. For example, as described in more detail below with respect to FIG. 2, performance client 136 may generate events, such as mouse and keyboard events, which VDI client 134 redirects to VDI agent 124. Performance agent 126 may then determine receipt times at which the events are received by VDI agent 124, and may cause indications of the receipt times to be displayed in a canvas within the virtual desktop screen. Performance client 136 may then extract the receipt times from the virtual desktop screen, and may compare the receipt times to the times at which the events were generated in order to determine one or more performance metrics, such as latency measurements. Additional performance metrics may also be determined, such as based on comparisons of the times at which the events were generated to times at which the indications are visible in the screen of the virtual desktop screen at the client device and/or comparisons of the receipt times or the times at which performance agent 126 causes the indications to be displayed in the virtual desktop screen to times at which the indications are visible in the virtual desktop screen at the client device. The performance metrics may allow for one or more optimizations to be performed with respect to the virtual desktop, as described in more detail below with respect to FIG. 3.

It is noted that while performance client 136 is depicted separately from VDI client 134, performance client 136 may alternatively be included within VDI client 134.

Data center 102 includes host(s) 105, a virtualization manager 130, a gateway 136, a management network 128, and a data network 118. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, VMs 120 may be containers that run on host 105 without the use of a hypervisor. One example of a hypervisor 116 that may be used is a VMware ESXi™ hypervisor provided as part of the VMware vSphere® solution made commercially available from VMware, Inc. of Palo Alto, Calif.

Each VM 120 includes a guest OS 122, one or more applications 123, a VDI agent 124, and a performance agent 126. Application(s) 123, VDI agent 124, and performance agent 126 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

Performance agent 126 performs operations related to measuring performance between VDI client 134 and host 105. For example, as described below with respect to FIG. 2, performance agent 126 may display a canvas within a virtual desktop screen and, when events generated by performance client 136 are received by VDI agent 124, performance agent 126 may cause indications of receipt times for the events to be displayed in the canvas.

It is noted that while performance agent 126 is depicted separately from VDI agent 124, performance agent 126 may alternatively be included within VDI agent 124.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 118 or network 128. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile).

Non-volatile memory is memory that retains its data after having power cycled (turned off and then back on). Non-volatile memory is byte-addressable, random access non-volatile memory.

Virtualization manager 130 communicates with hosts 105 via a network, shown as a management network 128, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 136 provides VMs 120 and other components in data center 102 with connectivity to network 146. Gateway 136 may manage external public IP addresses for VMs 120, route traffic incoming to and outgoing from data center 102, and provide networking services, such as firewalls, network address translation (NAT), dynamic host configuration protocol (DHCP), and load balancing. Gateway 136 uses data network 118 to transmit data network packets to hosts 105. Gateway 136 may be a virtual computing instance, a physical device, or a software module running within host 105. Gateway 136 may include two gateways: a management gateway for management network 128 and a data gateway for data network 118.

Figure 2:
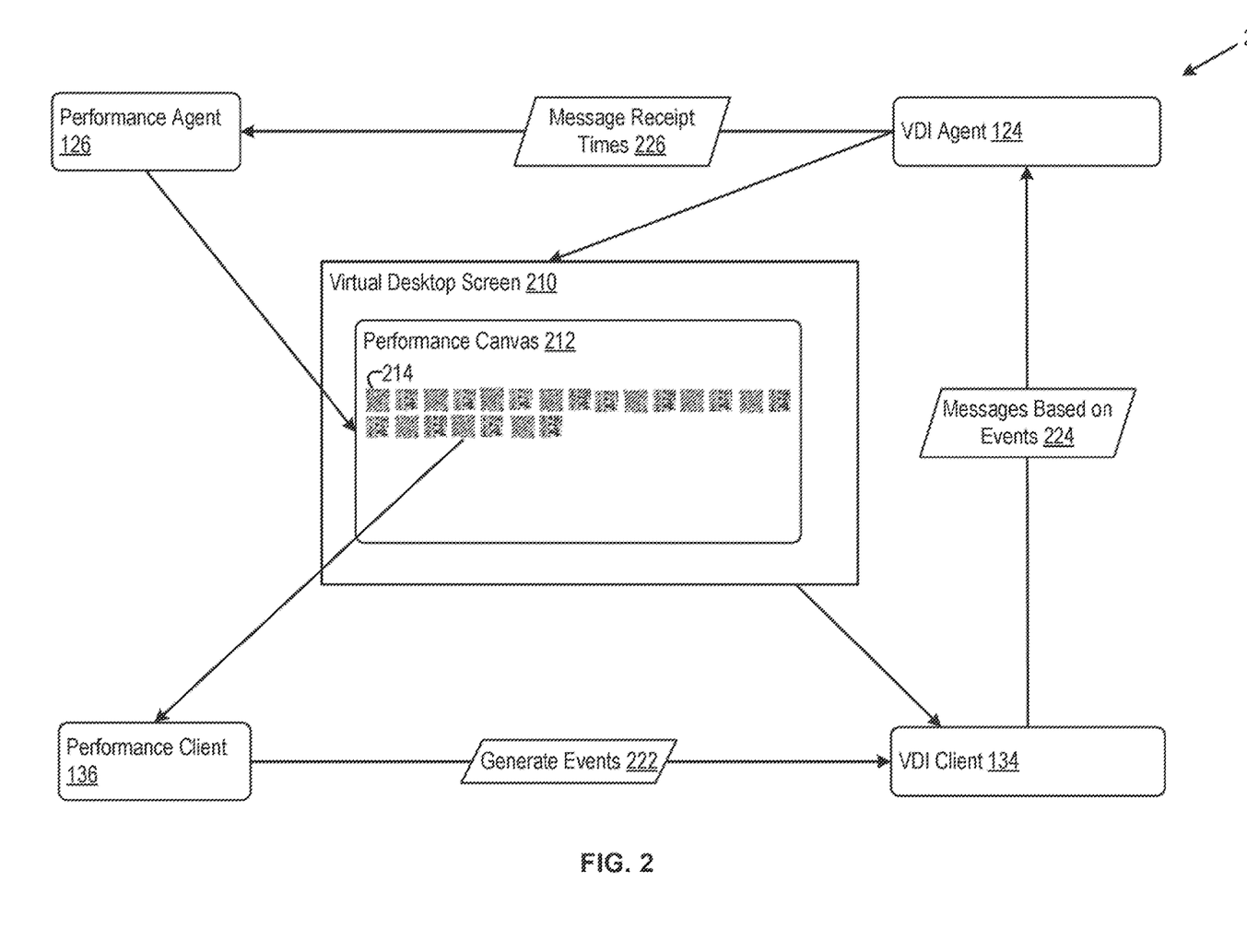
FIG. 2 is an illustration of an example related to measuring performance between a virtual desktop client and a remote device.

FIG. 2 is an illustration 200 of an example related to measuring performance between a virtual desktop client and a remote device. Illustration 200 includes performance client 136, VDI client 134, VDI agent 124, and performance agent 126 of FIG. 1.

Performance client 136 generates events 222 at client device 104 of FIG. 1. Events 222 may be simulated user input events, such as mouse and/or keyboard events. Performance client 136 may store times at which events 222 are generated. In some embodiments, the event generation times are stored in association with event identifiers that uniquely identify the events to which the times correspond.

VDI client 134 detects the events, such as via callbacks, and redirects the events to VDI agent 124 via messages 224. When VDI agent 124 receives messages 224, performance agent 126 determines message receipt times 226, which are the times at which messages 224 were received by VDI agent 124.

Performance agent 126 causes indications of message receipt times 226 to be displayed within a performance canvas 212. Performance canvas 212 generally represents a window displayed within virtual desktop screen 210, and is associated with performance agent 126. For example, performance agent 126 may be an application that runs within the virtual desktop, and performance canvas 212 may be a user interface of performance agent 126. Virtual desktop screen 210 generally represents the screen of a virtual desktop that is generated by VDI agent 124 and transmitted to VDI client 134 via a desktop delivery protocol.

The indications of message receipt times 226 that are displayed within performance canvas 212, including indication 214, generally allow performance client 136 to extract the message receipt times from virtual desktop screen 210. For example, as virtual desktop screen 210 is transferred to VDI client 134, performance client 136 may capture a screenshot of virtual desktop screen 210 and extract message receipt times 226 from the screenshot based on the indications displayed in performance canvas 212. In one example, as shown in illustration 200, the indications may comprise digital codes, such as quick response (QR) codes, which performance client 136 decodes in order to determine the message receipt times. The indications may alternatively include message receipt times 226 in numerical form. In some embodiments, the indications include identifiers of the events to which the indicated receipt times correspond.

Performance client 136 compares the message receipt times extracted from virtual desktop screen 210 to the times at which the events were generated in order to measure performance between VDI client 134 and the remote device on which the virtual desktop resides. For instance, performance client 136 may match an event generation time with a message receipt time based on an event identifier that is associated with both times. For example, each event may be associated with an event identifier, and the event identifier of a given event may be included in the message sent between VDI client 124 and the remote device. Subsequently, the event identifier may be included with the indication of the receipt time for the given event that is displayed in the virtual desktop screen. As such, performance client 136 may match the event identifier included with the indication to the event identifier of the event that was generated at the client device. In some cases, performance client 136 determines differences between event generation times and message receipt times in order to determine a performance metric such as latency. In other embodiments, performance client 136 calculates other performance metrics such as throughput, packet loss, bandwidth utilization, and the like based on the message receipt times. In certain embodiments, performance client 136 determines differences between event generation times and times at which the indications are visible in the virtual desktop screen at the client device in order to determine a round-trip latency. Furthermore, in some embodiments, performance client 136 determines differences between times at which the display of the indications was initiated at the remote device (e.g., which may be included in the displayed indications) or the receipt times and the times at which the indications are visible in the virtual desktop at the client device in order to determine a latency between the remote device and the client device.

In some cases, performance client 136 may generate reports, notifications, and/or the like based on the performance metrics determined using techniques described herein. For instance, performance metrics may be provided to a user associated with the virtual desktop and/or an administrator associated with the networking environment.

Various optimizations may be implemented based on the performance metrics, as described in more detail below with respect to FIG. 3.

Figure 3:
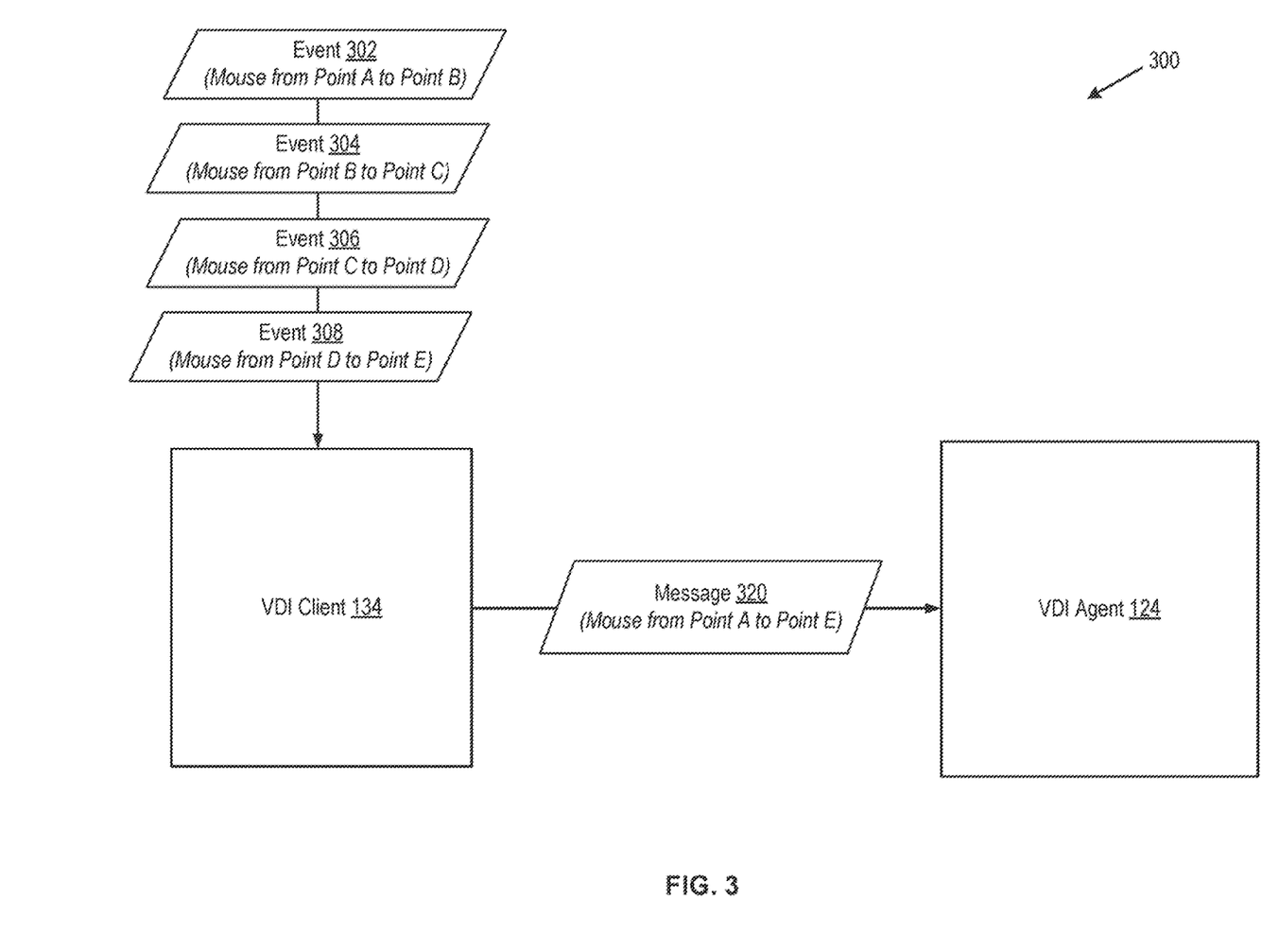
FIG. 3 is an illustration of an example optimization related to performance between a virtual desktop client and a remote device.

FIG. 3 is an illustration 300 of an example optimization related to performance between a virtual desktop client and a remote device. Illustration 300 includes VDI client 134 and VDI agent 124 of FIGS. 1 and 2.

A series of events 302, 304, 306, and 308 are detected by VDI client 134. Event 302 comprises a mouse movement event from point A to point B, event 304 comprises a mouse movement event from point B to point C, event 306 comprises a mouse movement event from point C to point D, and event 308 comprises a mouse movement event from point D to point E. Points A-E generally represent positions on a screen, such as coordinates of points at which a cursor is located.

While VDI client 134 would conventionally redirect all of events 302, 304, 306, and 308 to VDI agent 124, certain techniques described herein involve optimizing performance by dropping certain intermediary events as needed based on measured performance.

For example, if a latency between VDI client 134 and VDI agent 124 is determined to rise above a threshold, such as using techniques described above with respect to FIG. 2, VDI client 134 and/or VDI agent 124 may implement one or more performance optimizations. One example of a performance optimization is shown in illustration 300. Events 304 and 306 are intermediary events between events 302 and 308 and, thus, the movement of the mouse from Point A to Point E may still be redirected to VDI agent 124 without redirecting events 304 and 306. As such, a message 320 is sent from VDI client 134 to VDI agent 124 indicating a mouse movement event from Point A to Point E, thereby communicating the same overall mouse movement in a single message rather than four separate messages. For instance, VDI client 134 may drop events 304 and 306 and collapse events 302 and 308 into a single mouse movement event including only the starting point from event 302 and the ending point from event 308. It is noted that while illustration 300 only shows four events 302, 304, 306, and 308, this optimization may result in significantly higher performance gains when performed for larger sets of events. For example, if a set of 100 mouse movement events can be collapsed into a single event for redirection, this results in a 99% reduction of network traffic for redirecting the set of events.

In another optimization, rather than dropping intermediary events, VDI client 134 may batch events for redirection. For example, VDI client 134 may send events 302, 304, 306, and 308 to VDI agent 124 in a single message. Batching may be performed based on time intervals, numbers of events, or the like. In another optimization, a frame rate or resolution of the virtual desktop may be reduced based on measured performance.

While these optimizations may improve performance, it may be beneficial to limit their implementation to situations in which they are needed, such as when network performance is poor. For example, one or more optimizations may be discontinued if network performance improves, thereby allowing for a higher-quality end user experience to be provided when possible.

Figure 4:
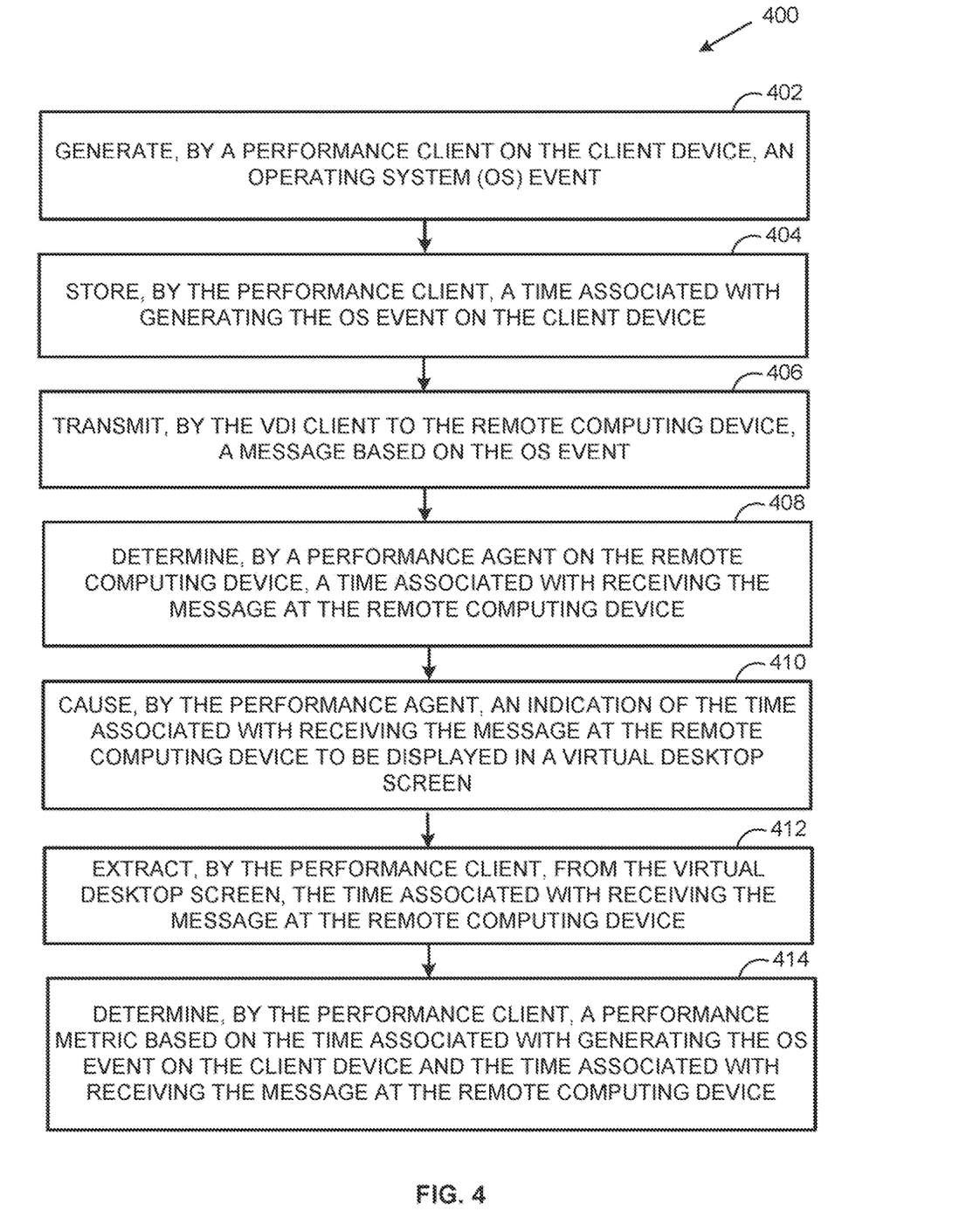
FIG. 4 depicts example operations related to measuring performance between a virtual desktop client and a remote device.

FIG. 4 illustrates example operations 400 related to measuring performance between a VDI client and a remote device. For example, operations 400 may be performed by one or more components of client device 104 and/or host 105 of FIG. 1.

Operations 400 begin at step 402, with generating, by a performance client on the client device, an operating system (OS) event.

Operations 400 continue at step 404, with storing, by the performance client, a time associated with generating the OS event on the client device, Operations 400 continue at step 406, with transmitting, by the VDI client to the remote computing device, a message based on the OS event.

Operations 400 continue at step 408, with determining, by a performance agent on the remote computing device, a time associated with receiving the message at the remote computing device.

Operations 400 continue at step 410, with causing, by the performance agent, an indication of the time associated with receiving the message at the remote computing device to be displayed in a virtual desktop screen. In some embodiments, causing, by the performance agent, an indication of the time associated with receiving the message at the remote computing device to be displayed in a virtual desktop screen comprises generating, by the performance agent, a digital code representing the time associated with receiving the message at the remote computing device and causing, by the performance agent, the digital code to be displayed in the virtual desktop screen. The digital code may, for example, comprise a quick response (QR) code.

Operations 400 continue at step 412, with extracting, by the performance client, from the virtual desktop screen, the time associated with receiving the message at the remote computing device. In some embodiments, extracting, by the performance client, from the virtual desktop screen, the time associated with receiving the message at the remote computing device comprises reading a digital code in an image of the virtual desktop screen to extract the time associated with receiving the message at the remote computing device from the digital code.

Operations 400 continue at step 414, with determining, by the performance client, a performance metric based on the time associated with generating the OS event on the client device and the time associated with receiving the message at the remote computing device. In some embodiments, determining, by the performance client, the performance metric based on the time associated with generating the OS event on the client device and the time associated with receiving the message at the remote computing device comprises calculating a difference between the time associated with generating the OS event on the client device and the time associated with receiving the message at the remote computing device to determine a latency between the VDI client and the remote computing device. Certain embodiments further include calculating a difference between the time associated with generating the OS event on the client device and a time at which the indication is visible in the virtual desktop screen from the client device. Some embodiments further include calculating a difference between a time at which the performance agent causes the indication to be displayed in the virtual desktop screen or the time associated with receiving the message at the remote computing device and a time at which the indication is visible in the virtual desktop screen from the client device.

Certain embodiments further include performing one or more performance optimizations at the VDI client or the remote computing device based on the performance metric. The one or more performance optimizations performed at the VDI client or the remote computing device based on the performance metric may, for instance, comprise one or more of: batching, by the VDI client, a plurality of OS events for transmission to the remote computing device in a single message; reducing a frame rate associated with transmitting the virtual desktop screen from the remote computing device to the VDI client; or dropping, by the VDI client, one or more intermediate OS events occurring between a first OS event and a second OS event.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of measuring performance between a virtualized desktop infrastructure (VDI) client running on a client device and a remote computing device, wherein the remote computing device is connected to the VDI client through a network, the method comprising:

generating, by a performance client on the client device, an operating system (OS) event;

storing, by the performance client, a time associated with generating the OS event on the client device;

transmitting, by the VDI client to the remote computing device, a message based on the OS event;

determining, by a performance agent on the remote computing device, a time associated with receiving the message at the remote computing device;

generating, by the performance agent, a digital code representing the time associated with receiving the message at the remote computing device;

causing, by the performance agent, the digital code to be displayed in a virtual desktop screen;

reading, by the performance client, the digital code in an image of the virtual desktop screen to extract the time associated with receiving the message at the remote computing device from the digital code; and determining, by the performance client, a performance metric based on the time associated with generating the OS event on the client device and the time associated with receiving the message at the remote computing device.

2. The method of claim 1, wherein the digital code comprises a quick response (QR) code.

3. The method of claim 1, further comprising performing one or more performance optimizations at the VDI client or the remote computing device based on the performance metric, wherein the one or more performance optimizations comprise one or more of:

batching, by the VDI client, a plurality of OS events for transmission to the remote computing device in a single message;

reducing a frame rate associated with transmitting the virtual desktop screen from the remote computing device to the VDI client; or dropping, by the VDI client, one or more intermediate OS events occurring between a first OS event and a second OS event.

4. The method of claim 1, wherein determining, by the performance client, the performance metric based on the time associated with generating the OS event on the client device and the time associated with receiving the message at the remote computing device comprises calculating a difference between the time associated with generating the OS event on the client device and the time associated with receiving the message at the remote computing device to determine a latency between the VDI client and the remote computing device.

5. The method of claim 1, further comprising determining, by the performance client, an additional performance metric based on:

the time associated with generating the OS event on the client device; and a time at which the digital code is visible in the virtual desktop screen at the client device.

6. The method of claim 1, further comprising determining, by the performance client, an additional performance metric based on:

the time associated with receiving the message at the remote computing device or a time associated with causing, by the performance agent, the digital code to be displayed in the virtual desktop screen; and a time at which the digital code is visible in the virtual desktop screen at the client device.

7. A system for measuring performance between a virtualized desktop infrastructure (VDI) client running on a client device and a remote computing device, wherein the remote computing device is connected to the VDI client through a network, the system comprising:

at least one memory; and at least one processor coupled to the at least one memory, the at least one processor and the at least one memory configured to:

generate, by a performance client on the client device, an operating system (OS) event;

store, by the performance client, a time associated with generating the OS event on the client device;

transmit, by the VDI client to the remote computing device, a message based on the OS event;

determine, by a performance agent on the remote computing device, a time associated with receiving the message at the remote computing device;

generate, by the performance agent, a digital code representing the time associated with receiving the message at the remote computing device;

cause, by the performance agent, the digital code to be displayed in a virtual desktop screen;

read, by the performance client, the digital code in an image of the virtual desktop screen to extract the time associated with receiving the message at the remote computing device from the digital code; and determine, by the performance client, a performance metric based on the time associated with generating the OS event on the client device and the time associated with receiving the message at the remote computing device.

8. The system of claim 7, wherein the digital code comprises a quick response (QR) code.

9. The system of claim 7, wherein the at least one processor and the at least one memory are further configured to perform one or more performance optimizations at the VDI client or the remote computing device based on the performance metric, and wherein the one or more performance optimizations comprise one or more of:

batching, by the VDI client, a plurality of OS events for transmission to the remote computing device in a single message;

reducing a frame rate associated with transmitting the virtual desktop screen from the remote computing device to the VDI client; or dropping, by the VDI client, one or more intermediate OS events occurring between a first OS event and a second OS event.

10. The system of claim 7, wherein determining, by the performance client, the performance metric based on the time associated with generating the OS event on the client device and the time associated with receiving the message at the remote computing device comprises calculating a difference between the time associated with generating the OS event on the client device and the time associated with receiving the message at the remote computing device to determine a latency between the VDI client and the remote computing device.

11. The system of claim 7, wherein the at least one processor and the at least one memory are further configured to determine, by the performance client, an additional performance metric based on:

the time associated with generating the OS event on the client device; and a time at which the digital code is visible in the virtual desktop screen at the client device.

12. The system of claim 7, wherein the at least one processor and the at least one memory are further configured to determine, by the performance client, an additional performance metric based on:

the time associated with receiving the message at the remote computing device or a time associated with causing, by the performance agent, the digital code to be displayed in the virtual desktop screen; and a time at which the digital code is visible in the virtual desktop screen at the client device.

13. A non-transitory computer-readable medium storing instructions that, when executed by one or more processors, cause the one or more processors to:

generate, by a performance client on a client device, an operating system (OS) event;

store, by the performance client, a time associated with generating the OS event on the client device;

transmit, by a VDI client to a remote computing device, a message based on the OS event;
determine, by a performance agent on the remote computing device, a time associated with receiving the message at the remote computing device;
generate, by the performance agent, a digital code representing the time associated with receiving the message at the remote computing device;
cause, by the performance agent, the digital code to be displayed in a virtual desktop screen;
read, by the performance client, the digital code in an image of the virtual desktop screen to extract the time associated with receiving the message at the remote computing device from the digital code; and
determine, by the performance client, a performance metric based on the time associated with generating the OS event on the client device and the time associated with receiving the message at the remote computing device.

14. The non-transitory computer-readable medium of claim 13, wherein the digital code comprises a quick response (QR) code.

* * * * *